Jan. 6, 1942.    W. DALTON    2,269,184
FREEZING TRAY
Filed Dec. 7, 1939
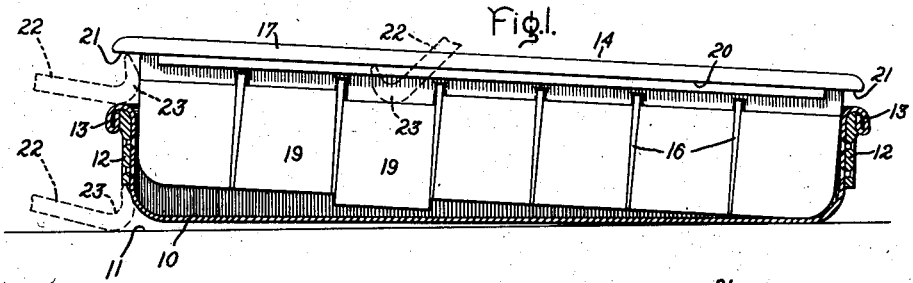
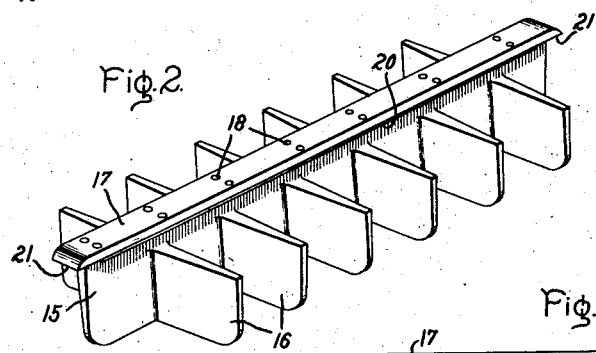
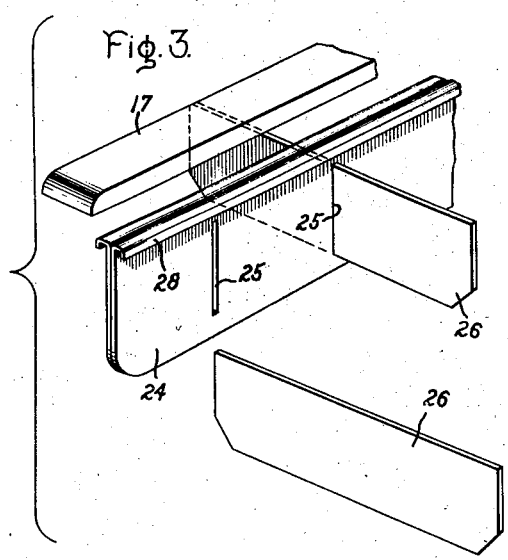
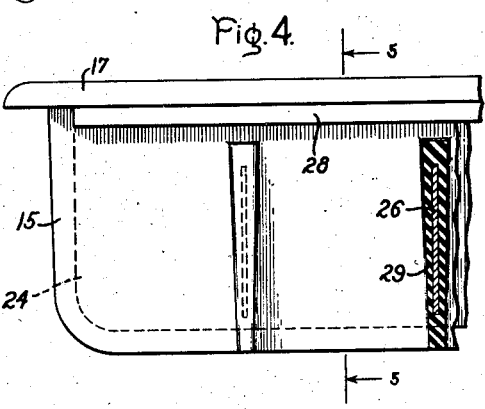
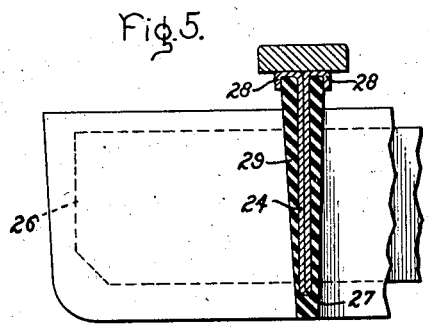
Inventor:
William Dalton,
by Harry E. Dunham
His Attorney.

Patented Jan. 6, 1942

2,269,184

UNITED STATES PATENT OFFICE 2,269,184

FREEZING TRAY

William Dalton, Schenectady, N. Y., assignor to General Electric Company, a corporation of New York Application December 7, 1939, Serial No. 307,998

2 Claims. (Cl. 62—108.5)

My invention relates to freezing trays and particularly to dividers for such freezing trays. The present case is a continuation in part of my copending application Serial No. 122,054, filed January 23, 1937.

Many types of mechanical refrigerating machines, and particularly those adapted for domestic use, are provided with a cooling unit arranged to receive freezing trays filled with water, ingredients for ice cream, or other substances to be frozen. These trays are filled with the substances to be frozen and are then placed upon the surface of the cooling unit of the refrigerating machine until the contents of the tray are frozen.

A divider or grid is commonly provided in freezing trays of this type in order to separate the same into a number of small compartments so that the ice or other substance in the freezing tray will be in the form of small blocks or cubes. The divider preferably is removable from the freezing tray to facilitate the removal of the ice cubes therefrom. After the ice blocks or the like have been formed in the tray, the tray is removed from the cooling unit of the refrigerating machine, warmed sufficiently to thaw the frozen bond between the tray and the ice blocks, and the divider and ice blocks contained therein are removed from the tray. The ice blocks may then be removed individually from the divider for use as desired.

It is an object of my invention to provide a removable divider of simple and improved construction adapted to facilitate the mechanical removal of ice cubes therefrom without the necessity of thawing the bond between the ice blocks and the divider.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig. 1 is a longitudinal sectional view of a freezing tray containing a divider embodying my invention, the divider being shown with ice blocks therein after release from the tray; Fig. 2 is a perspective view of the divider shown in Fig. 1; Fig. 3 is an exploded fragmentary perspective view of the divider shown in Fig. 1; Fig. 4 is an enlarged view of one end of the divider shown in Fig. 1 with a portion thereof shown in section; and Fig. 5 is a sectional view on the line 5—5 of Fig. 4.

Referring to the drawing, in Fig. 1 I have shown a shallow rectangular metal freezing tray 10 arranged on a supporting surface 11 of a suitable cooling unit of a refrigerating machine. The freezing tray 10 is reinforced at each end by rigidly securing a plate 12 to the end of the freezing tray below a rim 13 provided about the open top thereof. The freezing tray 10 contains a divider 14 constructed in a manner to be described below.

As will be seen in Fig. 2, the divider 13 comprises a continuous longitudinal partition element 15, a plurality of transverse partition elements 16, and a reinforcing member 17 rigidly secured along the top or upper edge of the longitudinal element 15 in some suitable manner such as by spot welding as indicated at 18. The partition elements 15 and 16 cooperate to form ice block compartments on each side of the divider which contain ice blocks 19, as shown in Fig. 1. Preferably the partition elements are of tapered cross-section increasing in thickness from the bottom toward the top to insure ready removal of the ice blocks 19 therefrom in a downwardly direction. The reinforcing member 17 extends from the longitudinal partition element over the ice block compartments to provide shoulders 20 on each side of the member to facilitate removal of the ice blocks 19 from the divider. The member 17 also extends from the longitudinal partition element 15 at each end thereof to provide shoulders 21 at the ends of the divider. The shoulders 21 are employed in removing the divider from the freezing tray.

A suitable lever such as a bar 22 having a curved end 23 as indicated in dotted lines in Fig. 1, is employed for removing the divider from the freezing tray and for removing the ice blocks from the divider. After the water placed in the freezing tray 10 has been frozen to form the ice blocks 19, the freezing tray is removed from the cooling unit of the refrigerating machine by placing the curved end 23 of the bar 22 between the supporting surface 11 and the reinforcing plate 12, as shown in Fig. 1. The bar is then swung downwardly to cause the curved end 23 thereof to break the frozen bond between the freezing tray and the supporting surface of the cooling unit. The freezing tray and the divider contained therein may then be removed from the cooling unit. The divider 14 carrying the ice blocks 19 is then removed from the freezing tray 10 by placing the curved end of the bar 22 against one of the shoulders 21 at the end of the reinforcing member 17 and swinging the bar downwardly to exert a force between the end of the tray and the divider. This breaks the frozen bond between the freezing tray and the ice blocks and raises the divider and the ice blocks carried thereby as shown in Fig. 1. Each of the ice blocks 19 may be removed individuallly from the divider by placing the curved end 23 of the bar 22 between the top surface of the ice blocks and the shoulder 26 and by then swinging the bar downwardly causing the curved end thereof to exert a force between the top surface of the block and the shoulder thereby readily forcing the block from the divider, the breaking of the bond being facilitated by the tapered construction of the partition elements. In Fig. 1, one block 19 is shown just after its release from the divider. Any desired number of ice blocks may be removed mechanically from the divider without thawing the frozen bonds between the remaining blocks and the divider or all of the blocks may be removed from the divider and collected in the freezing tray 10.

The specific arrangement of the divider and its method of construction may be understood more readily upon reference to Figs. 3, 4 and 5. The longitudinal partition member 15 comprises a continuous longitudinal metal partition element 24 provided with a number of equally spaced slots 25 along its length. The transverse partition elements 16 include a plurality of metal partition elements 26 passed through the slots 25 in the longitudinal partition element 24 and secured in place so that they are carried thereby. The longitudinal element 24 is a rigid integral structure formed of a metallic sheet bent upon itself at 27 to provide two walls in face engagement, as may readily be seen in Fig. 5. The edges of the sheet opposite the bend 27 are flanged outwardly in opposite directions as indicated at 28, and it is to these flanged portions that the reinforcing member 17 is rigidly secured in any suitable manner, such as by the spot welds indicated at 18 in Fig. 2. The metal partition elements 24 and 25 constitute a core and are provided with a suitable cover 29 which preferably is of tapered cross-section increasing in thickness from the bottom toward the top, as indicated in Figs. 1 and 2, to facilitate ready removal of the ice blocks frozen thereto. Preferably, the covering 29 is made of a water-resistant plastic composition such as rubber or other suitable water-resistant material, and is molded or otherwise suitably formed around the metallic core. The water-resistant coating provided on the metal core facilitates the removal of ice blocks and also affords protection of the metal core from corrosion. The flanges 28 of the partition 24 enclose and protect the upper edges of the molded covering 29.

It will be evident from the foregoing that I have provided a divider of reinforced construction, embodying an arrangement facilitating removal of the divider from a freezing tray and facilitating removal of ice blocks from the divider.

While I have shown and described certain embodiments of my invention, other modifications will be apparent to those skilled in the art. I do not, therefore, desire my invention to be limited to the particular construction shown and described, and I intend in the appended claims to cover all modifications within the spirit and scope of my invention.

What I claim as new and desire to secure by Letters Patent of the United States is:

1. A removable divider for freezing trays comprising a longitudinal partition element formed of a metallic sheet bent upon itself, a plurality of transverse partition elements carried by said longitudinal partition element and adapted to cooperate therewith and with a freezing tray to form ice block compartments, and a member extending along the upper edge of said longitudinal partition element, the edges of said sheet being flanged outwardly in opposite directions and both said edges being rigidly secured to said member, said member having a shoulder extending over said compartments to provide for mechanical removal of ice blocks from said compartments.

2. A removable divider for freezing trays comprising a longitudinal partition element formed of a metallic sheet bent upon itself, a plurality of transverse partition elements carried by said longitudinal partition element and adapted to cooperate therewith and with a freezing tray to form ice block compartments, a molded covering of water resistant material covering the walls of said partition elements, and a member extending along the upper edge of said longitudinal partition element, the edges of said sheet being flanged outwardly in opposite directions and both of said edges being rigidly secured to said member, the flanged portions of said sheet enclosing the upper edges of the molded covering on said longitudinal partition element, said member having a shoulder extending over said compartments to provide for mechanical removal of ice blocks from said compartments.

WILLIAM DALTON.